United States Patent [19]

Tredwell et al.

[11] Patent Number: 4,791,478
[45] Date of Patent: Dec. 13, 1988

[54] POSITION INDICATING APPARATUS

[75] Inventors: Colin J. Tredwell; Donald R. C. Price, both of Kent, England

[73] Assignee: GEC Avionics Limited, England

[21] Appl. No.: 783,422

[22] Filed: Oct. 3, 1985

[30] Foreign Application Priority Data

Oct. 12, 1984 [GB] United Kingdom ................. 8425827

[51] Int. Cl.[4] ........................................... H04N 13/00
[52] U.S. Cl. ...................................... 358/88; 340/709; 358/89
[58] Field of Search ....................... 358/88, 89, 90, 91, 358/92, 107, 108; 340/709, 710

[56] References Cited

U.S. PATENT DOCUMENTS 4,214,267 7/1980 Roese et al. ........................... 358/88

Primary Examiner—James J. Groody
Assistant Examiner—Michael D. Parker
Attorney, Agent, or Firm—Kirschstein, Kirschstein, Ottinger & Israel

[57] ABSTRACT

An apparatus for indicating the position of an object in a three dimensional space is described. The apparatus includes a video arrangement for producing a stereoscopic image of a scene including the object. Overlay generators superimpose on this image a stereoscopic image of a cursor. Cursor control means are provided for varying the apparent position of the cursor in the scene and for providing an output representing the apparent position of the cursor.

5 Claims, 3 Drawing Sheets

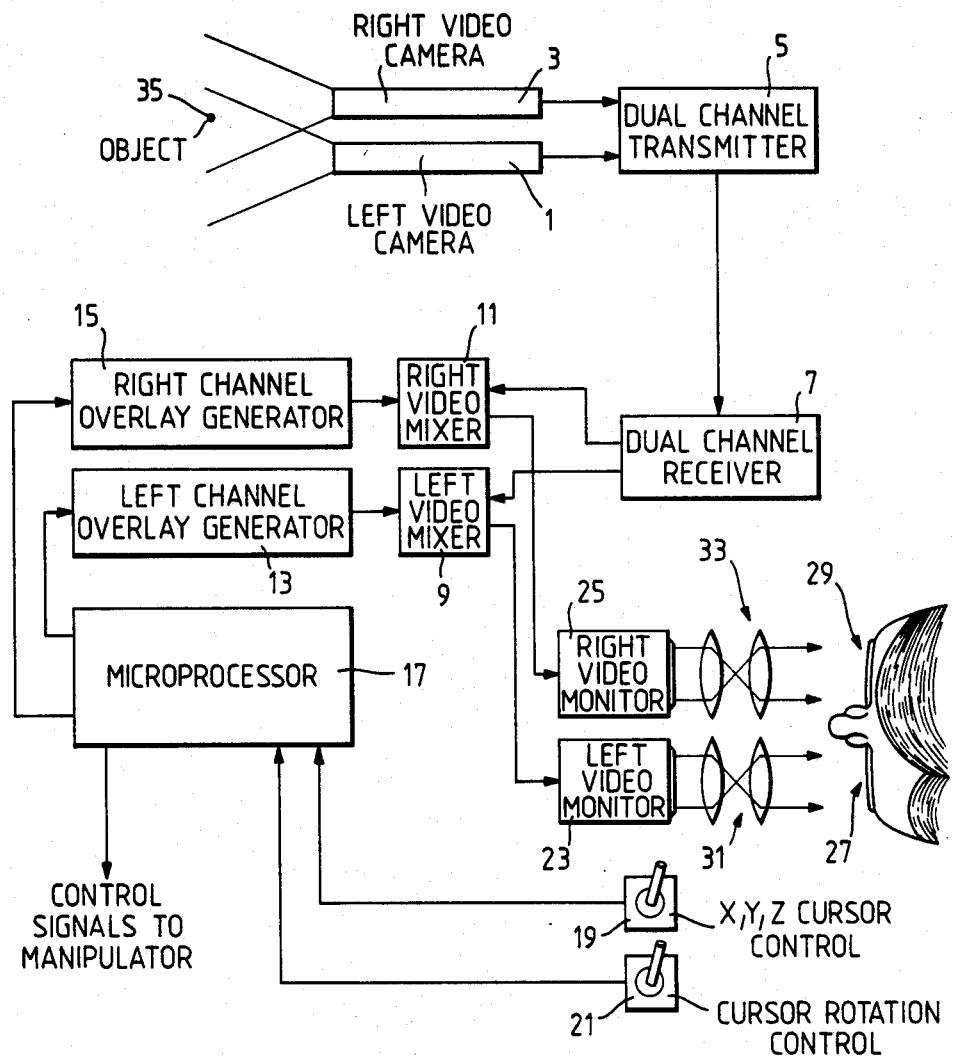

4,791,478

POSITION INDICATING APPARATUS

BACKGROUND OF THE INVENTION

1. Field of the Invention

This invention relates to apparatus for indicating the position of an object in three dimensional space.

Such an apparatus finds application for example in robotics when it is required to place under remote control a manipulator adjacent to an object to be manipulated.

2. Description of the Related Art

A known form of such apparatus comprises a binocular stereoscopic viewing arrangement comprising means for obtaining two two-dimensional images of the scene including the object and the manipulator viewed from two points separated by a distance equal to the average observer interocular distance, the two images being separated by this distance. An observer is then able to fuse the two images and derive an appreciation of the range of any point within the scene due to the inherent binocular disparities between the two images. Such an apparatus can be used by an operator to place, under remote control, a manipulator adjacent to an object using his or her judgement of the relative positions of the manipulator and object in his or her stereoscopic view of the scene, but this can be a slow and difficult process.

SUMMARY OF THE INVENTION

It is on object of the present invention to provide an apparatus which provides an indication of the position of an object in three dimensional space in such a manner as to facilitate the positioning of a manipulator adjacent the object.

According to the invention an apparatus for indicating the position of an object in a three dimensional space comprises: imaging means for producing a stereoscopic image of a scene including the object; superimposing means for superimposing on said image a stereoscopic image of a cursor; control means for varying said cursor image so as to vary the apparent position of the cursor in said scene; and signal generating means for deriving from said control means signals representing the apparent position of the cursor.

In a preferred embodiment of the invention said imaging means comprises means for producing two two-dimensional images of said scene from two viewing positions separated by a distance equal to the interocular spacing of an observer, and means for respectively displaying said images at positions separated by said distance for respectively viewing by the two eyes of the observer so as to produce said stereoscopic image; said superimposing means comprises means for superimposing on each of said displayed images a respective one of two two-dimensional images of the cursor; and said control means comprises means for varying the respective positions of said cursor images in said images of the scene so as to vary the apparent position of said cursor in said scene.

Preferably said control means further include means for varying the size of at least a portion of the stereoscopic image of the cursor with variation of the apparent range of the cursor, thereby to enhance the stereoscopic subjective impression of the cursor obtained by the observer.

In one particular embodiment of the invention at least part of said cursor is of apparent three-dimensional form; said control means includes means for varying the form of said stereoscopic image of the cursor so that said part appears to the observer to rotate about at least one axis; and said signal generating means includes means for deriving from said means for varying the form an output signal representing the apparent angular position of said part of the cursor about said axis.

It will be understood that, since an apparatus according to the invention provides outputs indicative of the positions of objects designated by a cursor, before the actual task of placing a manipulator adjacent an object is commenced, the apparatus can be used to obtain indications of the positions of the object, the present and desired positions of the manipulator, and obstacles between them, thus considerably facilitating the subsequent movement of the manipulator to a desired position.

The invention also provides a method of indicating the position of an object in a three dimensional space, the method comprising: producing a stereoscopic image of a scene including the object; superimposing on said image a stereoscopic image of a cursor; varying said cursor image so as to vary the apparent position of the cursor in said scene; and deriving signals representing the apparent position of the cursor.

BRIEF DESCRIPTION OF THE DRAWINGS

One apparatus and method for indicating the position of an object in three dimensional space in accordance with the invention will now be described by way of example only, with reference to the accompanying drawings in which:

FIG. 1 is a schematic diagram of the apparatus;

DETAILED DESCRIPTION OF THE PREFERRED EMBODIMENTS

Figure 2A:
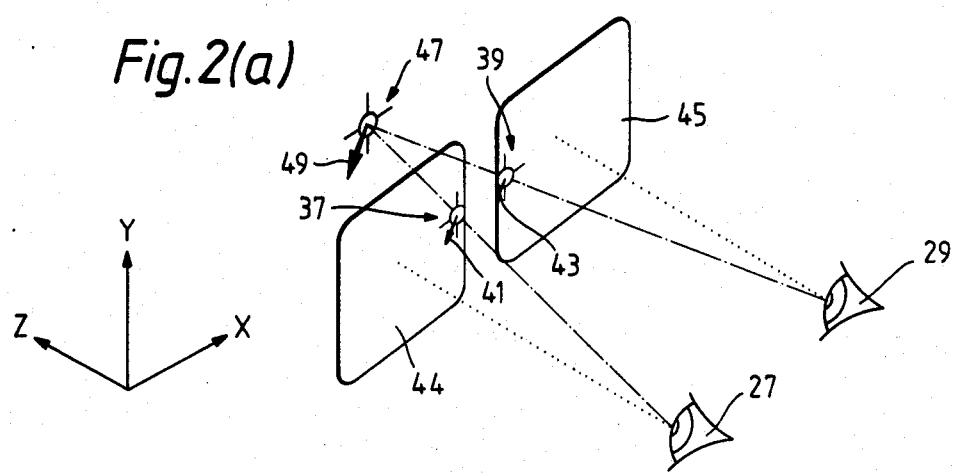
FIGS. 2 (a), 2 (b), 2 (c) illustrate a first aspect of the principle of operation of a cursor arrangement used in the apparatus shown in FIG. 1.

Referring first to FIG. 1, the apparatus includes a pair of video cameras 1, 3 situated at a remote worksite, the cameras being accurately aligned in a parallel spaced configuration, separated by a distance equal to the average human interocular distance. The outputs of the cameras 1, 3 are connected to a dual channel transmitter 5 which is arranged to transmit signals representative of these outputs to a dual channel receiver 7 situated in an operating location. Separate video signals from the left 1 and right 3 video cameras are fed from the receiver 7 to respective left 9 and right 11 video mixers, video signals from left channel 13 and right channel 15 overlay generators also being respectively fed to the left 9 and right 11 video mixers. Control signals to the left and right channel overlay generators 13, 15 are provided by a microprocessor 17 which in turn is controlled by signals from X, Y, Z cursor control unit 19, and a cursor rotation control unit 21 whose functions are further described hereafter, each unit having a joystick control with three degrees of freedom. The microprocessor 17 also provides control signals to a manipulator (not shown) as also further described hereafter.

The outputs of the left 9 and right 11 video mixers are fed to left 23 and right 25 video monitors respectively the displays of the two monitors being separated by the interocular distance such that the left 27 and right 29 eyes of an observer may simultaneously view the respective images presented on the screens of the monitors 23, 25 via respective eye pieces 31, 33.

Figure 2B:
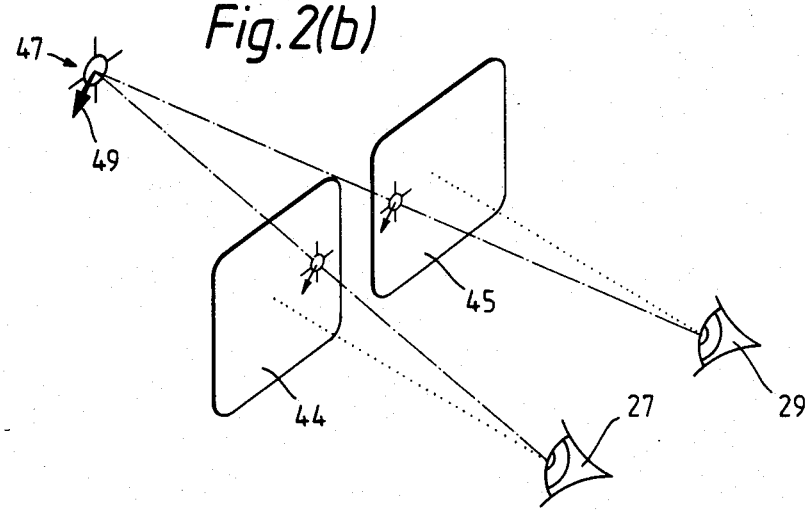
Figure 2C:
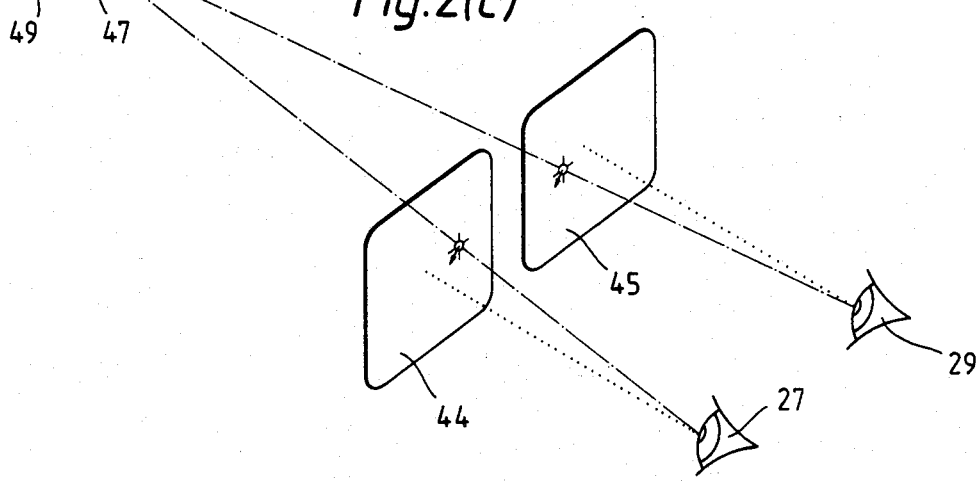
Figure 3A:
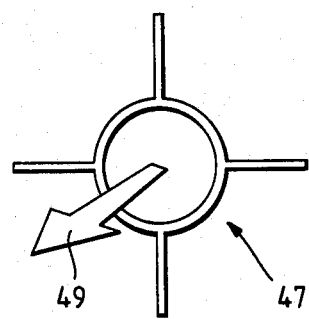
FIGS. 3 (a), 3 (b), 3 (c), 3 (d) illustrate a second aspect of the principle of operation of the cursor arrangement used in the apparatus shown in FIG. 1 on an enlarged scale to that of FIG. 2.
Figure 3B:
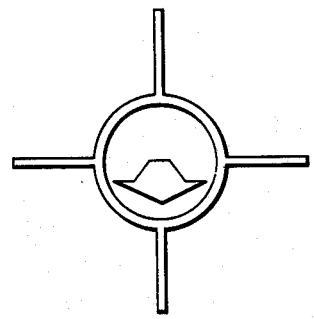
Figure 3C:
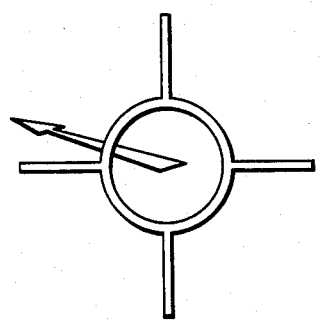
Figure 3D:
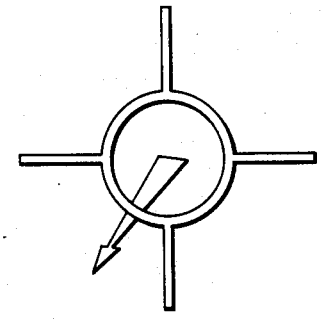

In use of the apparatus the video cameras 1, 3 are focussed on a real-life scene which includes the object 35 whose position it is required to indicate, to facilitate the placing of the manipulator, under remote control, adjacent to the object. The images produced by the cameras 1, 3 are presented on the screens of the monitors 23, 25 respectively via the transmitter 5, receiver 7 and video mixer 9 or 11. The left and right channel overlay generators 13, 15 under the control of the microprocessor 17, provide signals to the left and right video mixers 9, 11 respectively, to produce a respective image of a cursor 37 or 39 overlying the scene image on the screen of each of the monitors 23 or 25. As best seen in FIGS. 2 (a), 2 (b) and 2 (c) each cursor is in the form of a circle cut by two lines representing the X and Y axes, each cursor further including a moveable directional indicator 41 or 43 whose function is described hereafter.

Turning now particularly to FIG. 2 (a), the cursors 37, 39 are arranged such that in the left 44 and right 45 image planes viewed by the left 27 and right 29 eyes of the observer through the left and right eye pieces 31, 33 respectively, the X axes of the cursors 37, 39 are aligned with each other. The microprocessor is however programmed so that the Y axes are displaced from each other so as to present the observer with a virtual stereoscopic image 47 of a single cursor located within his or her stereoscopic view through the eye pieces 31, 33 of the scene viewed by the video cameras 1, 3, i.e. at a position along the Z direction indicated in FIG. 2. In order to indicate the position of the object 35 within the scene, the observer first uses the joystick control of the cursor control unit 19 to provide signals to the microprocessor 17 effective to cause both cursors 37, 39 to move in the XY plane such that the stereoscopic cursor image 47 overlies the image of the object 35 in the stereoscopic field of view of the observer. The operator then uses the joystick control of the cursor control unit 19 to cause the two cursors 37, 39 to move relative to each other along the X direction such that the stereoscopic cursor image 47 appears to the observer to move along the Z axis to a position where it appears to be coincident with the object in the stereoscopic field of view of the observer. Thus, referring also to FIGS. 2 (b) and 2 (c) which depict different apparent positions of the cursor image 37 along the Z axis, as the cursor images 37, 39 in the image planes 44, 45 move away from each other in a direction towards the centre lines shown as dotted lines in FIGS. 2 (a), (b), (c) the stereoscopic cursor image 47 will appear to recede along the Z direction. In order to enhance the illusion of motion of the cursor 47 towards, or away from the observer the microprocessor is further programmed to cause the size of the cursor to decrease in accordance with the rules of perspective as the cursor image 47 appears to move away from the observer, and increase as it appears to move towards the observer.

When the observer has aligned the cursor image 47 such that it is coincident with the image of the object in the stereoscopic field of view of the observer, the X, Y, Z co-ordinates of the cursor stored in the microprocessor 17 may then be used to provide control signals for moving the manipulator adjacent to the object 35. It is often desirable however for a manipulator to approach an object from a particular direction, and with a particular orienation and to this end the directional indicator 41 or 43 in each cursor image 37 or 39 is provided. The indicators 41, 43 are arranged to be aligned in the image planes 44, 45 such that the observer sees a stereoscopic virtual image 49 of a single indicator in the cursor image 47. By use of the joystick control of the cursor rotation control unit 21 the observer is able to provide suitable control signals to the microprocessor 17 to create the illusion of rotational movement of the indicator image 49 in three dimensional space relative to the cursor image 47 to the required orienation of the manipulator relative to the object 35. FIGS. 3 (a), 3 (b), 3 (c) and 3 (d) illustrate four possible orientations of the indicator image 49 relative to the cursor image 47, data corresponding to the orientation of the indicator being stored in each case in the microprocessor 17.

Thus the operator is able to define the required position in three-dimensional space, and the required orientation of the manipulator without the necessity to move the manipulator itself. If required, the rotational freedom of the indicator image 49 may be restricted to that achievable with the actual manipulator.

It will be appreciated that many other cursor configurations may be used in an apparatus in accordance with the invention.

It will also be appreciated that whilst the apparatus described by way of example employs two separate video cameras in the binocular arrangement employed in the apparatus, the invention is also applicable to apparatus in which the two images of the scene viewed from different points are projected onto a single camera, means being provided to separate the left and right images presented to the observer. Examples of such arrangements are described in U.S. Pat. Nos. 3,251,933 and 3,670,097, and UK patent application No. 2040134 A.

It will also be appreciated that whilst the apparatus described heretofore has particular application in situations where it is required to place a manipulator adjacent to an object, an apparatus in accordance with the invention is applicable in any situation where it is required to obtain an indication of the position of an object in three-dimensional space.

What is claimed is:

1. An apparatus for indicating the position of an object in a three-dimensional space comprising: imaging means including means for producing two two-dimensional images of a scene including said object from two viewing positions separated by a distance equal to the interocular spacing of an observer, and means for respectively displaying said images at positions separated by said distance for respective viewing by the two eyes of the observer so as to produce a stereoscopic image of said scene; superimposing means for superimposing on said stereoscopic image a stereoscopic image of a cursor including means for superimposing on each of said displayed images a respective one of two two-dimensional images of said cursor; control means including means for varying the respective positions of said cursor images in said images of the scene so as to vary the apparent position of said cursor in said scene; and signal generating means for deriving from said control means signals representing the apparent position of said cursor.

2. An apparatus according to claim 1 in which each two-dimensional image of the cursor comprises two orthogonal lines.

3. An apparatus for indicating the position of an object in a three-dimensional space comprising: imaging means for producing a stereoscopic image of a scene including the object; superimposing means for superimposing on said image a stereoscopic image of a cursor; control means for varying said cursor image so as to vary the apparent position of the cursor in said scene; and signal generating means for deriving from said control means signals representing the apparent position of the cursor; said control means further including means for varying the size of at least a portion of the stereoscopic image of the cursor with variation of the apparent range of the cursor, thereby to enhance the stereoscopic subjective impression of the cursor obtained by an observer.

4. An apparatus for indicating the position of an object in a three-dimensional space comprising: imaging means for producing a stereoscopic image of a scene including the object; superimposing means for superimposing on said image a stereoscopic image of a cursor; and signal generating means for deriving from said control means signals representing the apparent position of the cursor; at least part of said cursor being of apparent three-dimensional form; said control means including means for varying the form of said stereoscopic image of the cursor so that said part appears to an observer to rotate about at least one axis; and said signal generating means including means for deriving from said means for varying the form an output signal representing the apparent angular position of said part of the cursor about said axis.

5. An apparatus according to claim 4 in which said part comprises an arrow apparently rotatable out of a plane of a two-dimensional part of the cursor.

* * * * *